United States Patent
Iyer et al.

(10) Patent No.: US 8,755,342 B2
(45) Date of Patent: Jun. 17, 2014

(54) SYSTEM AND METHOD FOR DYNAMIC BEARER SELECTION FOR IMMERSIVE VIDEO COLLABORATION IN MOBILE WIRELESS NETWORKS

(75) Inventors: Jayaraman Iyer, San Jose, CA (US); Laurent Andriantsiferana, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 314 days.

(21) Appl. No.: 13/253,730

(22) Filed: Oct. 5, 2011

(65) Prior Publication Data

US 2013/0091526 A1    Apr. 11, 2013

(51) Int. Cl.
*H04W 80/10* (2009.01)

(52) U.S. Cl.
USPC .................. 370/329; 370/468; 725/95

(58) Field of Classification Search
None
See application file for complete search history.

(56) References Cited

U.S. PATENT DOCUMENTS

| | | | |
|---|---|---|---|
| 6,138,156 A | 10/2000 | Fletcher et al. | |
| 6,431,875 B1 | 8/2002 | Elliott et al. | |
| 6,477,590 B1 | 11/2002 | Habusha et al. | |
| 6,687,252 B1 | 2/2004 | Bertrand et al. | |
| 6,714,987 B1 | 3/2004 | Amin et al. | |
| 6,775,273 B1 | 8/2004 | Kung et al. | |
| 6,778,494 B1 | 8/2004 | Mauger | |
| 6,847,991 B1 | 1/2005 | Kurapati | |
| 6,853,630 B1 | 2/2005 | Manning | |
| 6,854,014 B1 | 2/2005 | Amin et al. | |
| 6,888,821 B2 | 5/2005 | Rasanen et al. | |
| 6,973,309 B1 | 12/2005 | Rygula et al. | |
| 7,454,206 B1 | 11/2008 | Phillips et al. | |
| 7,724,753 B2 | 5/2010 | Naqvi et al. | |
| 7,813,759 B2 | 10/2010 | Virgile | |
| 7,855,982 B2 | 12/2010 | Ramankutty et al. | |
| 7,945,648 B2 | 5/2011 | Tan | |
| 8,010,984 B2 | 8/2011 | Thukral | |
| 2002/0029260 A1 | 3/2002 | Dobbins et al. | |
| 2002/0131404 A1 | 9/2002 | Mehta et al. | |
| 2003/0016630 A1 | 1/2003 | Vega-Garcia et al. | |

(Continued)

FOREIGN PATENT DOCUMENTS

WO    WO-0122642 A2    3/2001

OTHER PUBLICATIONS

CTLabs Report, "SIP and RTP Denial of Service Attack Tests Summary." pp. 1-4. 2005. 4 pages.

(Continued)

*Primary Examiner* — Jianye Wu
(74) *Attorney, Agent, or Firm* — Wilmer Cutler Pickering Hale and Dorr LLP (57) ABSTRACT

The disclosure relates to managing the video and audio streams of a video collaboration session in a communication network. Specifically, the streams of the video collaboration session are managed by primitive messages that are sent in-band with the data of the stream. These in-band primitives are then used to modify the wireless bearers or channels that are carrying the streams to a mobile device. The mechanism can dynamically adapt the wireless bearers based on the primitives to ensure characteristics such as Quality of Service and packet loss are within certain parameters while minimizing the resources used to provide the specified service.

20 Claims, 7 Drawing Sheets

(56) References Cited

U.S. PATENT DOCUMENTS

| | | | |
|---|---|---|---|
| 2004/0047290 | A1 | 3/2004 | Komandur et al. |
| 2004/0111476 | A1 | 6/2004 | Trossen et al. |
| 2005/0005025 | A1 | 1/2005 | Harville et al. |
| 2005/0034079 | A1* | 2/2005 | Gunasekar et al. ........... 715/753 |
| 2006/0031559 | A1 | 2/2006 | Sorokopud et al. |
| 2007/0022199 | A1 | 1/2007 | Tatsubori |
| 2008/0137541 | A1 | 6/2008 | Agarwal et al. |
| 2009/0254572 | A1* | 10/2009 | Redlich et al. .................. 707/10 |
| 2009/0320077 | A1 | 12/2009 | Gazdzinski |

OTHER PUBLICATIONS http://www.3gpp.org, 3GPP TS 24.229 V6. 12.0 (Sep. 2006), pp. 1-304. Oct. 3, 2006. 304 pages.

http://www.3gpp.org/ftp/Specs/html-info/24229.htm printed Jan. 13, 2011. 4 pages.

http://www.acmepacket.com/html/page.asp?PageID=%7bFB2657BA-EE7A-46C1-BEA8-F650C93BF5C3%7d—printed on Dec. 5, 2009. 4 pages.

* cited by examiner

```
     0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |V=2|P|    RC=0     |   PT=RR=201   |           length=1            |
    +-+-+-+-+-+-+-+-+-+-+-+-+-+-+-+-+-+-+-+-+-+-+-+-+-+-+-+-+-+-+-+-+
    |                            SSRC                               |
    +-+-+-+-+-+-+-+-+-+-+-+-+-+-+-+-+-+-+-+-+-+-+-+-+-+-+-+-+-+-+-+-+
    |V=2|P|    SC=1     |  PT=SDES=202  |           length              |
    +-+-+-+-+-+-+-+-+-+-+-+-+-+-+-+-+-+-+-+-+-+-+-+-+-+-+-+-+-+-+-+-+
    |                            SSRC                               |
    +-+-+-+-+-+-+-+-+-+-+-+-+-+-+-+-+-+-+-+-+-+-+-+-+-+-+-+-+-+-+-+-+
    |   CNAME=1     |     length    |     user and domain name   ...
    +-+-+-+-+-+-+-+-+-+-+-+-+-+-+-+-+-+-+-+-+-+-+-+-+-+-+-+-+-+-+-+-+
    |V=2|P|   subtype   |   PT=APP=204  |           length              |
    +-+-+-+-+-+-+-+-+-+-+-+-+-+-+-+-+-+-+-+-+-+-+-+-+-+-+-+-+-+-+-+-+
    |                            SSRC                               |
    +-+-+-+-+-+-+-+-+-+-+-+-+-+-+-+-+-+-+-+-+-+-+-+-+-+-+-+-+-+-+-+-+
    |                         name=xcts                             |
    +-+-+-+-+-+-+-+-+-+-+-+-+-+-+-+-+-+-+-+-+-+-+-+-+-+-+-+-+-+-+-+-+
                                 ...
```

SYSTEM AND METHOD FOR DYNAMIC BEARER SELECTION FOR IMMERSIVE VIDEO COLLABORATION IN MOBILE WIRELESS NETWORKS

FIELD OF THE DISCLOSURE

This disclosure relates to adapting bearers in a wireless network for video collaboration with others in a communication network.

BACKGROUND

Videoconferencing generally refers to technologies that allow people to participate in a meeting as if they were present, even though they are not located at the same place. Videoconferencing can make use of video and other technologies that together implement the sensory elements of vision, sound, and manipulation. Videoconferencing systems may be implemented as conference rooms with large-format video screens, microphones, speakers, cameras, collaboration interfaces and lighting, that are connected via networks to other videoconferencing systems so that participants in a videoconferencing session feel as if they are all together in one conference room. Other implementations may include only desktop-based videophones for participants.

Videoconferencing systems are typically "fixed," in that the media streams they use to communicate information between participants are hosted on fixed wireline access networks, in which the media streams travel over relatively high bandwidth wires. In contrast, mobile devices such as smartphones communicate over wireless networks, which often have more limited bandwidth and quality of service (QoS) than wireline networks. Fully extending videoconferencing capabilities to such mobile devices presents numerous challenges, including those caused by both the limitations of the mobile devices and of the wireless networks in which the devices operate. While it is generally known to configure a videoconferencing session to stream a one-way video and/or audio media stream to a mobile device, and to allow the mobile device to send information to videoconferencing participants by communicating through collaborative tools, such configurations are limited by the mobile environment, and do not provide the mobile user with the qualities and capabilities that users have come to expect when using fixed videoconferencing systems.

DESCRIPTION OF EXAMPLE EMBODIMENTS

Overview

Some embodiments include a method for receiving, at a radio access network, a plurality of video streams and a plurality of audio streams that are part of a video collaboration session in a transport protocol, determining that in-band information regarding the plurality of video and audio streams is provided in transport control protocol primitives generated by a network device involved in communicating the plurality of video streams and a plurality of audio streams in the video collaboration session, performing an inspection of the video stream and the audio stream to map the streams to radio frequency (RF) bearers where an indicator is used to identify the mapping, and adapting the RF bearers based on information in received in-band primitives of an associated stream in the video collaboration session, wherein the information of the received in-band primitives are used to determine dynamic changes to the RF bearers.

Example Embodiments

This disclosure relates to controlling video collaboration in a wireless network. Video collaboration applications such as videoconferencing and peer-to-peer gaming can require significant network resources. In traditional video applications, such as video-on-demand and video-streaming, the corresponding media streams are generally predictable and unidirectional with a single source and one or more destinations for the video content. Video collaboration applications involve at least one audio and video source at a number of endpoints, and in some cases can involve multiple feeds that can be heterogeneous. For example, in an immersive video conference, one endpoint could generate multiple video feeds if multiple participants were involved while other endpoints might only generate a single video and audio feed.

In wired access networks, the requirements for the video collaboration can be more easily addressed by provisioning adequate fixed resources for the particular task. The resources in some cases can even be scheduled in advance because the resources may be dedicated for the purpose of hosting the video conferences. In wireless networks, however, it is more challenging to provision these resources on a permanent basis because the radio frequency spectrum is shared and highly dynamic. In some embodiments, a system and method are disclosed to dynamically assign radio frequency resources for video collaboration applications. These embodiments allow the mobile user to experience as close to the static (fixed) videoconferencing experience on a mobile device as is possible given the capabilities of the videoconferencing application (client software) associated with and installed on the mobile device. These embodiments allow mobile devices that are "videoconferencing aware" to establish a session to the Enterprise videoconferencing control elements, which are then able to tailor the call leg to the mobile network, and to interact with the mobile network to deliver appropriate quality of service (QoS).

The videoconferencing systems may be either Enterprise or Service Provider hosted. For example, the mobile network may be a WiFi network hosted by the Enterprise, or an LTE or WiMax-based network hosted by a Service Provider, such as a wireless provider. In some embodiments, the mobile network is enhanced to enable dynamic monitoring and matching of bandwidth resources to the call leg to deliver a quality of experience as a premium service by the Service Provider.

Mobile devices such as smartphones, tablet computers, and other intelligent mobile devices with audio, video, and data capabilities are increasingly being used by subscribers. As noted above, there are numerous challenges to extending video collaboration capabilities to such devices. These challenges include those associated with accommodating the differences between mobile wireless networks and fixed wireline access networks such as:

Technology Mobility: Mobile users move between multiple access technologies such as 2.5G (CDMA or GSM), 3G, 4G (LTE or WiMAX), Femto, and WiFi.

Device Mobility: Mobile users change cells within an access technology type, e.g. 4G.

User Mobility: Mobile users access services using different devices, and they port services among devices.

Link Bandwidth Variations: The instantaneous bandwidth delivered by the mobile network can fluctuate with a high degree of variability. This variation depends on number of parameters, such as radio coverage, access technology, type of radio bearer, and device capabilities. At the same time, the video portion of videoconferencing can be very demanding in terms of required bandwidth, as well as particularly sensitive to latency, jitter, and packet loss.

Device Capability and Limitations: Mobile devices are typically challenged both on battery life, processing capabilities, and screen sizes.

Economics: Unlike fixed line access, the shared radio resource at the macro cell site is an expensive medium to support the volume of data within video traffic. Moreover, the backhaul links have limited bandwidth. Meanwhile, the Service Providers search for ways to manage the video traffic over their wireless networks and make new business cases out of the video applications.

In addition, while many fixed video collaboration systems may be Enterprise-hosted within a fixed Enterprise network, mobile devices may be hosted and operate within a Service Provider's network, outside of the Enterprise. This entails additional complexity in providing mobile videoconferencing, because Service Provider hosted mobile networks may be limited in terms of both the control mechanisms available to support videoconferencing, and the ability to modify existing network components. For example, the Service Provider may be a wireless phone provider whose network is not under the control of the Enterprise hosting the fixed video collaboration system. Moreover, the Service Provider's wireless network may not have the ability to accommodate the media streams associated with the video collaboration system in a manner capable of delivering the media streams associated with a video collaboration system with sufficient quality of service. The following embodiments can help to extend fixed video collaboration conference capabilities to mobile devices despite these challenges.

Figure 1:
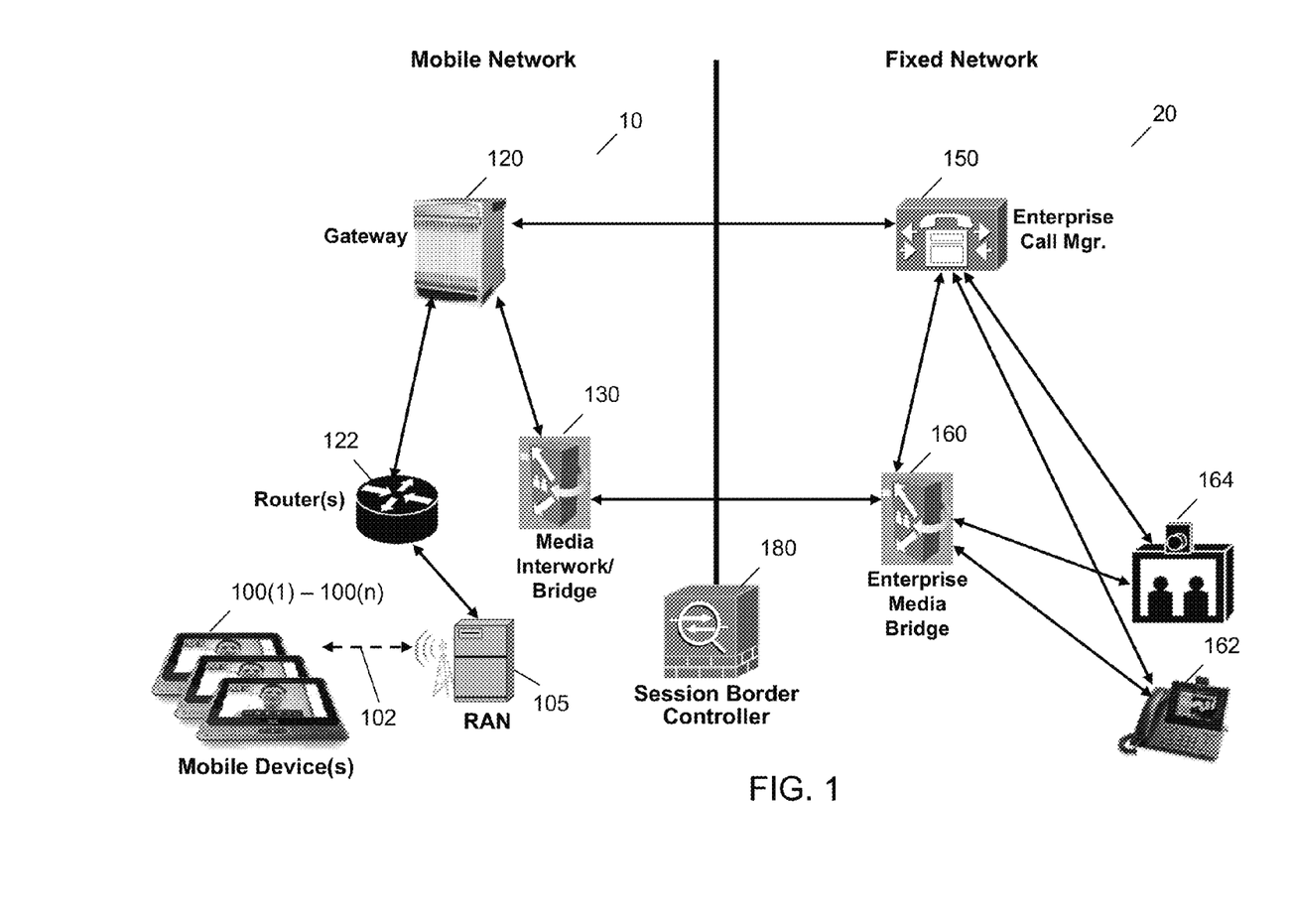
FIG. 1 illustrates a communication network in accordance with some embodiments.

FIG. 1 illustrates a communication network including components that support interworking and interoperability between a fixed videoconferencing system and a mobile network in accordance with certain embodiments, including components involved in providing call service signaling, policy control, and media plane processing. Cisco TelePresence™ is one type of system that may be used to provide videoconferencing in some embodiments.

Shown within the mobile network 10 are <n> mobile devices 100(1) through 100(n), each having a videoconferencing application associated with each respective device, each participating in a communication session, and each of which communicate through wireless link 102 using radio access network (RAN) 105. RAN 105 is in communication with gateway 120 through one or more routers 122. Gateway 120 is also shown in communication with media interwork/bridge 130.

Gateway 120 can access and maintain information relating to the communication session, the subscriber, the RAN radio bearers, and the policies relating to the communication session. The gateway 120 may be used to provide various services to a mobile device and to implement the QoS on packet flows. Several of these functions are used in providing, for example, voice over IP (VoIP) routing and enhanced services, such as enhanced charging, stateful firewalls, traffic performance optimization (TPO). The communication networks also allow provision of applications such as VoIP, streaming video, streaming music, multi-user gaming, location based services, and a variety of content delivered to a mobile node. In addition, gateway 120 may be used to help implement mobile videoconferencing, as explained in additional detail below.

Also shown within the fixed network 20 shown in FIG. 1, videoconferencing end points such as videophone 162 and videoconferencing room controller 164 can communicate with media bridge 160. Videophone 162, videoconferencing room controller 164, and media bridge 160 are also in communication with call manager 150. Call manager 150 handles calls between videoconferencing and videoconferencing end points, as well as performing translation of H.323 traffic to and from SIP as needed. Media bridge 160 provides multipoint communication between videoconferencing end points. In addition to supporting modes of operation suitable for communicating with videoconferencing end points within the fixed network, call manager 150 and media bridge 160 are capable of modes of operations that are also suitable for communicating with mobile videoconferencing end points. These latter modes may, for example, be more tolerant of the possible gaps in communication, lower bandwidth, and decreased floor control capabilities of mobile devices than modes of operation directed at fixed videoconferencing end points.

The above architectures may be used to extend videoconferencing to mobile devices through any number of wireless network technologies. Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area.

The first generation of wireless telephone technology used analog mobile phones in which analog information signals were transmitted. As technology progressed a second generation (2G) of wireless service was introduced. In 2G systems, digital information signals were used to modulate a carrier. These 2G technologies used time division multiplexed access (TDMA) or code division multiple access (CDMA) technologies to distinguish multiple users. Such networks that were upgraded to handle higher-speed packet data in networks referred to as 2.5G and 3G networks. The 3rd Generation Partnership Project (3GPP) and the 3rd Generation Partnership Project 2 (3GPP2) respectively developed the GSM/UMTS/HSDPA and cdmaOne/CDMA2000 technologies. The next evolution is 4G technology, which is referred to as long term evolution-system architecture evolution (LTE-SAE) and uses orthogonal frequency division multiple access (OFDMA) technology.

Other wireless protocols have also developed including WiFi, an implementation of various IEEE 802.11 protocols, WiMAX, an implementation of IEEE 802.16, and HiperMAN, which is based on an ETSI alternative to IEEE 802.16.

Figure 2:
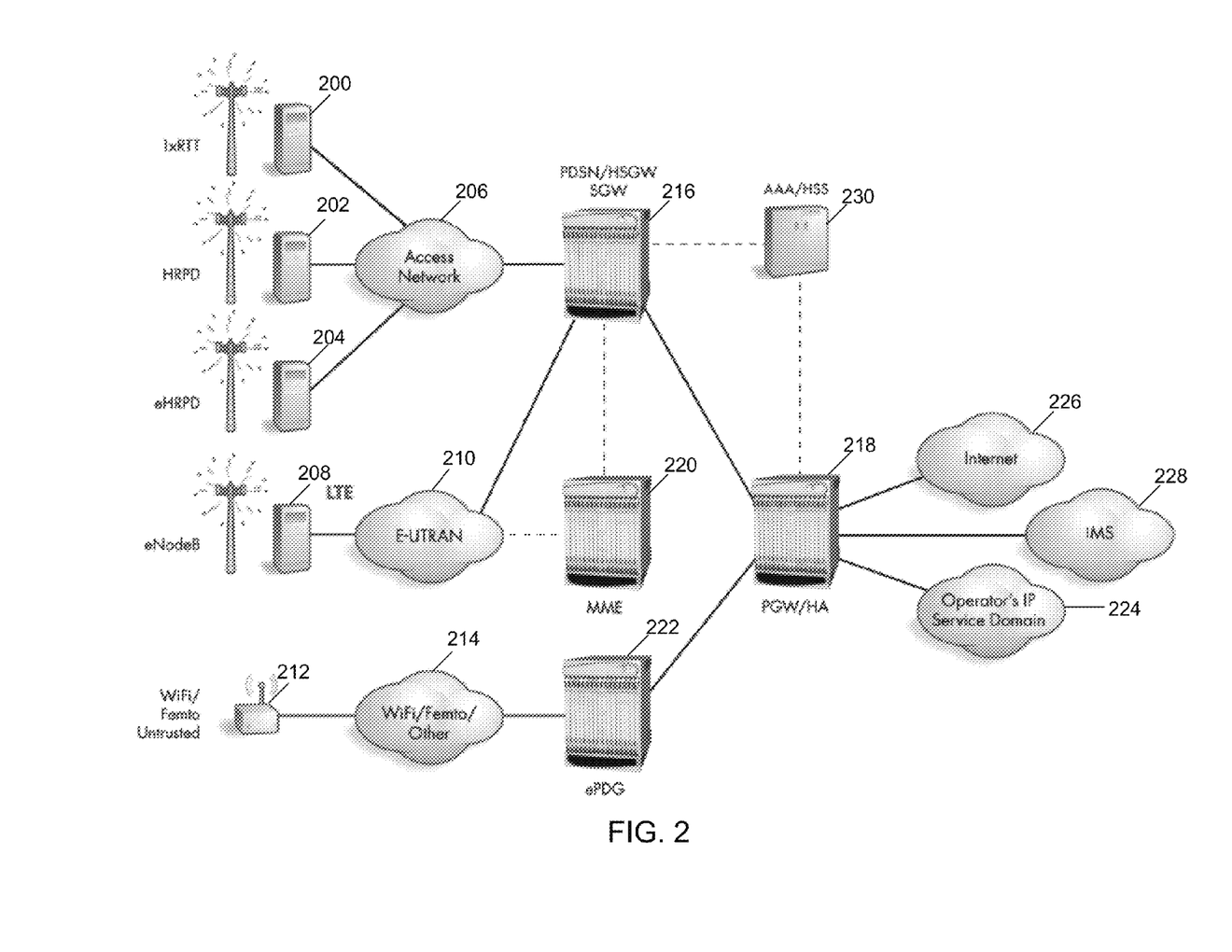
FIGS. 2-3 illustrate various communication networks including a long term evolution (LTE) communication network topology in accordance with certain embodiments.

FIG. 2 illustrates a communication network that includes dynamic resource allocation for video collaboration in accordance with certain embodiments. FIG. 2 includes a number of radio access technologies such as a 1xRTT transceiver 200, a high-rate packet data (HRPD) transceiver 202, and an evolved high-rate packet data (eHRPD) transceiver 204, each of which can connect to an access network 206. An evolved Node B (eNodeB) transceiver 208 is an LTE network radio network component that connects to an Evolved UMTS Terrestrial Radio Access Network (E-UTRAN) 210. Other radio access technologies such as WiFi, Femto, WiMAX, or any other radio spectrum technology can use transceiver 212 to connect to the network using a broadband or other access network.

The access network 206 can communicate with an access gateway 216 that implements a combination of functionalities such as a packet data serving node (PDSN), a HRPD serving gateway (HSGW), and a serving gateway (SGW). In operation, the PDSN functionality can be used with 1xRTT 200, the HSGW functionality can be used with HRPD 202 and eHRPD 204, and the SGW functionality can be used with the eNodeB 208. The access gateway 216 can communicate with an anchor gateway 218, which can implement a packet data network gateway (PGW) and a Home Agent (HA) and a mobility management entity (MME) 220. On the access network side, the anchor gateway 218 can also communicate with an evolved packet data gateway (ePDG) 222 which provides connectivity to the WiFi/Femto/other transceiver 212. On the packet core side, the anchor gateway can communicate with the operator's IP service domain 224, the internet 226, and IP multimedia subsystem (IMS) 228. An authentication, authorization, and accounting (AAA) server/home subscriber server (HSS) 230 can communicate with the access gateway 216, the anchor gateway 218, or both.

The Home Subscriber Server (HSS) 230 can be a master user database that supports IMS network entities that handle calls. The HSS 230 stores subscription-related information (subscriber profiles), performs authentication and authorization of the user, and can provide information about the subscriber's location and IP information. The AAA server 230 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 230 can communicate with the access gateway 216 for charging purposes.

The LTE communication network includes a PDN gateway (PGW) 218, a serving gateway (SGW) 216, an E-UTRAN (evolved-UMTS terrestrial radio access network) 210, and a mobility management entity (MME) 220. The evolved packet core (EPC) of an LTE communications network includes the MME 220, SGW 216 and PGW 218 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1X and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 220 is a control-node for the LTE access network. The MME is responsible for UE tracking and paging procedures including retransmissions. MME 220 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Non-Access Stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 222 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 3:
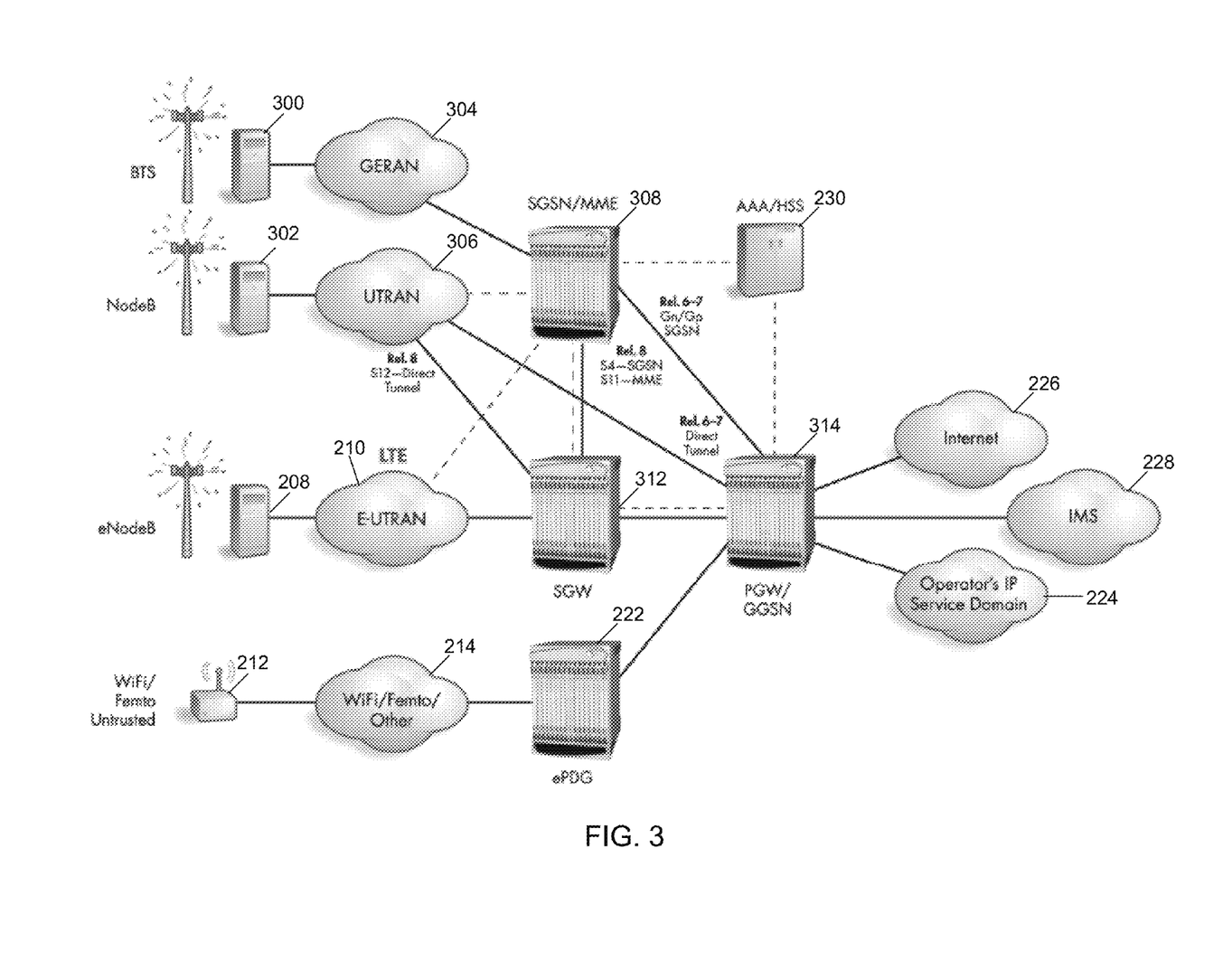

FIG. 2 illustrates a communication network that implements dynamic resource allocation for video collaboration with legacy universal mobile telecommunications systems (UMTS) network devices in accordance with certain embodiments. The legacy transceivers include base transceiver station (BTS) 300 and NodeB transceiver 302. The BTS 300 can communicate with a GSM EDGE Radio Access Network (GERAN) 304 and the NodeB 302 can communicate with a UMTS terrestrial radio access network (UTRAN) 306. The serving GPRS support node (SGSN) can be implemented on a gateway 308 with a mobility management entity (MME). The GERAN 304 can communicate through the SGSN functionality on gateway 308 to serving gateway (SGW) 312 or gateway GPRS support node (GGSN)/PGW 314.

In some systems, dynamic resource allocation for multimedia applications in wired and wireless access systems can be based on the Policy Control framework described in the IMS specifications. These approaches rely on Call Control components of application functions such as the call session control function (CSCF) within the service provider network, which derives from SIP/SDP (session initiation protocol/session description protocol) call control information and the associated policies for the bearer. The policy control infrastructure push policy rules to the gateways that act as Policy Control Enforcement Function (PCEF) controlling user sessions. The changes to user sessions in turn change the radio frequency (RF) bearer characteristics. The bearer is the wireless data channel for carrying user data. The RF bearer is typically mapped to one or more unidirectional Internet Protocol (IP) packet flows.

Immersive video collaboration application can include significant and dynamic resources such as multiple high-definition, high-quality audio and video sources per endpoint, varied endpoint capabilities, low loss bearers for running compression algorithms such as H.264, and bi-directional data flows. One way to meet the challenges associated with mobile video collaboration applications is to provide a signaling plane within the radio access network. This signaling place can use real-time transport control protocol (RTCP) as a signaling plane with simplified messaging. The RTCP packets can be modified or information within the RTCP packets can be used in order to convey additional information to adapt the RF bearer for video collaboration. The information used to convey information used to adapt resources for video collaboration are called primitives. This information can be provided in-band with the streams of data associated with the video collaboration session. When information is provided in-band, this means it is provided in the same channel, stream, or path as the underlying data such as the video data or audio data. The primitives are simple control or instructive messages. The primitives can be special fields in existing packet headers, special messages in the data stream, or extensions of a protocol.

Radio Frequency technologies, such as orthogonal frequency-division multiplexing (OFDM) used in WIMAX and LTE networks, can be adapted to match the application requirements included specified conditions for bandwidth, burst, packet loss, and jitter, for example. The RF technologies can also be dynamically adapted in order to consistently meet the specified conditions when conditions on the RF bearer change. In order to dynamically adapt the RF bearers, the RTCP messaging and associated mechanisms are implemented in the Radio Access Network in some embodiments. In contrast with an out of band signaling mechanism, where there is inherent delays and controls nodes can be located away from the RF bearers, a solution provided in the Radio Access Network (RAN) can provide the highest level of interactivity and re-activeness.

In embodiments where the dynamic resource application is present in the Radio Access Network, a component in the Radio Access Network is able to monitor RTCP traffic and the corresponding RTCP primitive information. The RTCP primitive information is then related to the corresponding RF bearer. When a video collaboration session is initiated, the corresponding RF bearer(s) are created either statically by provisioning, or using existing Policy Control approach defined by IMS. One or more static RF bearers with different characteristics are created. These bearers can be created for best-effort, guaranteed, variable-bit-rate, and varying degrees of reliability, as specified.

Figure 4:
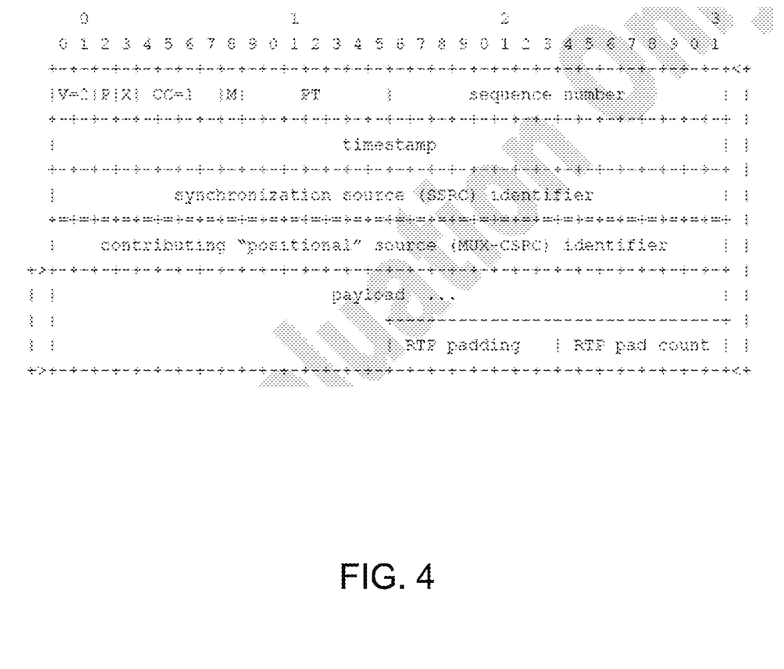
FIGS. 4-5 illustrate protocol messages for sending information in-band with video collaboration session data streams in accordance with some embodiments.

The devices utilizing RTCP primitive messaging can negotiate the number of media streams that they will exchange using the RTCP primitives, but to external infrastructure entities these appear as traditional Voice over IP (VoIP) devices with audio and video capabilities. FIG. 4 illustrates an modified real-time transport protocol (RTP) packet for use in video collaboration in accordance with certain embodiments. The RTP packets are used to carry to media streams that include the content of the video collaboration between two or more devices.

The modified RTP packets enables multiple media streams, that belong to the same media type, to be transported on the same channel (e.g., user datagram protocol (UDP)). In order to provide this capability, the protocol uses a multiplex point for the multiple streams based on a label, which is referred to as a position. The modified RTP packet includes a synchronization source (SSRC) identifier (see FIG. 4) that is used to identify the session and the transmitter. A contributing positional source (MUX-CSRC) identifier (see FIG. 4) can be used to identify information regarding the multiplexed streams carried in the payload of the packet.

For the video stream multiplex, an encoding format can be used such as H.264. When the same encoding format is used by all the streams, each video stream can be identified and its media configuration options described by using in-band parameter sets such as H.264 SPS/PPS parameter sets. For the audio stream multiplex, multiple encoding formats such as AAC-LD, G.711, and G722 may be used depending of the device capabilities and the call topology. The real-time transport protocol (RTP) media streams are sent on the same channel can be multiplexed by using different RTP MUX-CSRC values for each stream. Each RTP stream can include its own RTP sequence number and RTP timestamp space and generally a change in the value of the SSRC is accompanied by a change of the sequence number and timestamp. Stream position information denotes the spatial relationship or functional use of the stream. Audio and video streams with the same positions are intended to accompany each other. For example, there is a physical correspondence between the left audio position and the left video position such that multiple video and audio streams can be used in the video collaboration.

Figure 5:
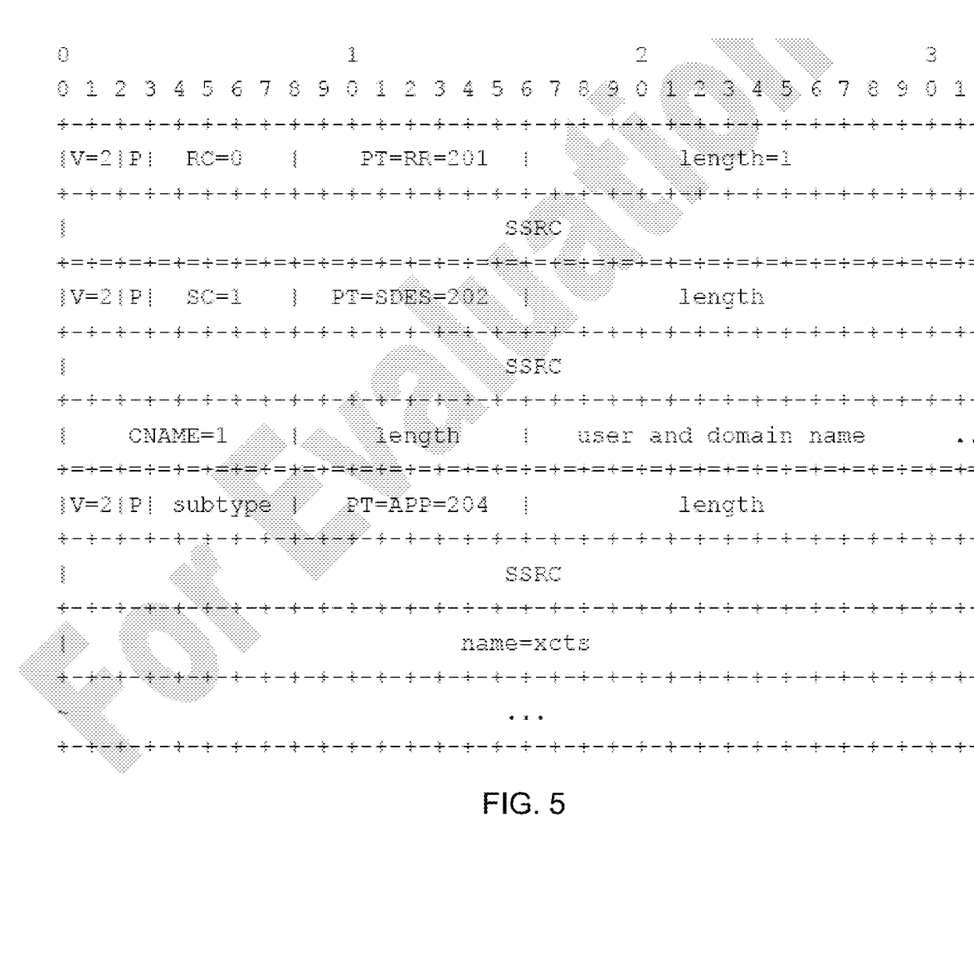

When using the RTCP primitive protocol for dynamic resource management, generally a network device detects whether its remote peer is capable of understanding the protocol. The remote peer can be an endpoint device in the video collaboration session or a device that is participating in the video collaboration session. In some embodiments, the remote peer can be a different type of device from the other peer devices. The process of detecting whether another device is capable of understanding the protocol can be performed through a handshake procedure to determine whether the protocol can be used. The protocol uses an APP packet, which is an extension of RTCP and allows control information to be transmitted. FIG. 5 illustrates an RTCP APP primitive packet in accordance with certain embodiments. The RTCP primitive messages define an RTCP APP MUXCTRL packet that informs the remote peer about media multiplexing capabilities. This includes the number of media streams that a device is going to transmit and is capable of receiving for a given media channel of a particular type (e.g., audio or video). The RTCP APP MUXCTRL packet also allows the receiver to specify the media positions it is planning to transmit and receive. The reception of an RTCP APP MUXCTRL packet or an RTCP APP MUXCTRL ACK packet can be used as an acknowledgement that the RTCP primitive messaging is understood by the remote peer.

A number of control extensions or RTCP primitives may be used in the video collaboration protocol. A RTCP primitive can be created by prepending an empty receiver report (RR) and session description (SDES with CNAME) before the APP packet (see FIG. 5). In order to enable accurate measurements of the network path between peers, an RTCP primitive can be used to determine various characteristics of the network path. This RTCP primitive can be an ECHO primitive. This primitive provides the echo function in-band such that the same network path and QoS are applied to the measurement packets and the media packets providing a more accurate measurement. The in-band transmission of the information also allows the RTCP primitive echo packets to avoid being filtered by intermediate systems such as firewalls. The RTCP primitive echo packets can be used to measure network path latency and keep alive information, for example. An echo packet can be transmitted once per second during a call on each channel, and the measurements averaged over ten second periods.

During a video collaboration session, the in-band information provided in the RTP and RTCP primitive packets can be monitored on network devices that have control over the RF bearers. As mentioned above, this can include Radio Access Network devices such as a base station, but it can also include gateways such as the PGW. These gateways in the access network can be used to trigger the EPS bearer binding and dedicated bearer establishment or the network-initiated packet data protocol (PDP) activation.

The dynamic resource allocation mechanism works in part by inspecting the RTCP primitives using deep packet inspection (DPI) and by mapping the information to the RF bearers. The process of triggering the dedicated bearer/secondary PDP establishment, traffic flow template (TFT) mapping and QoS activation can occur at startup or on demand. In some embodiments, the RF bearers are created at startup and then the flows are mapped to the right bearers by the RTCP primitive DPI mechanism later. In other embodiments, the bearers and other resources are setup on demand when the video collaboration service is started or a modification to the bearer is detected by the DPI mechanism. The modifications to the bearer setup can be communicated through the RTCP primitives by using fields to indicate the changes to the media streams and the corresponding RF bearers.

In some embodiments, the video flow and the audio flow can be mapped to the same RF bearer or different bearers at startup. At startup, the DPI mechanism will detect the RTCP primitive messaging in the protocol capable network device and can begin mapping the bearers to media flows in memory. The mappings can include an identifier of the media stream such as the SSRC of the RTCP primitive as well as the indemnification of the RF bearer such as a RF bearer ID. Other information can also be associated with these IDs such as media capability options and parameters for the flow.

During the sessions the RTCP and RTCP primitives are monitored to detect events such as the media capability options that can be used to select the appropriate bearer or trigger a modification in the bearer selection. For example, when a multi-point session event is detected, a bearer with a higher burst capabilities can be selected because it is expected that the media traffic will be more dynamic due to room/speaker switching events. When an H.246 IDR (instantaneous decoding refresh) frame is detected the proper RF bearer is selected to provide a higher burst, higher reliability capability. When an additional media is added by an endpoint (e.g., auxiliary video-collaboration) a bearer with additional uplink bandwidth can be selected or an existing bearer can be modified to provide such characteristics. When a flow control event is detected, the corresponding RF bearer is selected in order to modify the bearer in accordance with the flow control instructions received in the RTCP primitive or other in-band control message.

In addition to the dynamic selection of the RF bearer, the protocol and mechanism can provide other capabilities such as dynamic error control. The dynamic error control can be performed on a media stream, such as video, based on the monitoring of the RTCP primitive messaging. As the error rates of the link change, the robustness of the link can be dynamically changed by retransmitting lost segments over the link. Since the monitoring and control signaling is provided in the access network and close to the radio resources, these adjustments can be made to the media stream. It is largely infeasible to make similar adjustments to media streams using out-of-band control signaling because of the delays involved with such signaling.

The dynamic resource management can also be provided for other aspects of the video collaboration. For example, in a H.264/MPEG-4 Part 10 there is an AVC (Advanced Video Coding) bitstream for high definition video and is used in storage in discs and for streaming internet sources such as in video collaboration. In video collaboration, there can be multiple AVC bitstreams for the content. The RTCP primitives can be used to monitor and dynamically adjust the various AVC bitstreams in-band. For example, the AVC bitstream can be monitored to determine the error rate observed as well as the bandwidth observed at either the RTCP primitive receiver and/or the end-user bearers. The error rate observed can be determined by tracking when the error correction code in the packets is not correct. For example, that the cyclic redundancy check (CRC) code is correct. The bandwidth being used for each AVC bitstream can also be stored and the bandwidth be adjusted based on the observed error rates an algorithm to ensure certain error rates are maintained.

The RTCP primitive can be used to signal to an RTCP primitive capable network device to dynamically select and switch specific AVC bitstreams. The AVC bitstreams are marked with segment markers, so that alignment and selection can be performed mid-stream based on the bandwidth desired. The selection and switching can be performed for each flow and coordinated with overall admission control. The per-segment and per-bitstream control can be managed by using different RTP MUX-CSRC values for each segment and bitstream. The RTCP primitives can also include priority levels for the different AVC bitstreams. The priority levels can be inputted into the algorithm for modifying the AVC bitstreams to divide the bandwidth proportionally among the different bitstreams when there are bandwidth constraints. For example, the RTCP primitive capable network device would allow higher priority for certain video stream and a lower priority for other video streams.

Typically, the signaling/control plane is responsible for how videoconferencing calls and are managed, including registration, scheduling of calls, call setup, and call release. Within signaling/control plane, fixed videoconferencing end points, e.g., videophone 162 and/or videoconferencing room controller 164, register via SIP or H.323 protocols. Likewise, mobile IMS-based SIP end points will register to a P-CSCF and be served by an S-CSCF that has interfaces to application servers and registries providing call control features. There is also a Border GW Control Function (BGCF) that handles interaction with non-IMS SIP and other signaling systems. The BGCF may be implemented as part of the signaling aspect of border control element 180, or as part of gateway 120. This complex of functionality will just be collectively referred to as the IMS complex. The IMS complex is a substitute on the mobile network for the interoperability call manager 150 that interacts with media bridge 160 within the fixed network. As such, the IMS complex supports similar interfaces to media interwork/bridge 130 as call manager 150 provides to media bridge 160.

The Session Description Protocol (SDP) is used with SIP to define each end point's media handling capabilities. An SDP Offer-Answer exchange narrows the set of media protocols down to the common set to be used on a specific call. Because media codecs are standardized as well as the SDP attributes describing their options, existing SDP media lines and attributes may be used. The IMS complex can use the SDP to identify that a call is a videoconferencing call and adjust the policy accordingly.

Policy control is provided within the mobile and fixed networks to use Policy and Charging Control (PCC) mechanisms to properly match the session bearers setup to meet the videoconferencing QoS requirements, and provide or enhance continuity to the call leg during minor disruptions due to radio effects or handovers as the mobile user migrates. Some of same network elements that have been developed for packet-based 4G mobile networks for setup of broadband connections may be used to provide policy control for mobile videoconferencing. For example, mobile policy control function includes a Gx interface to radio access network 105, along with an Rx interface to mobile application control, and optionally an interface to media interwork/bridge 130 to allow for control and shaping of media streams supplied to the mobile device. The Application Function (AF, aka the CSCF) can use the Rx interface to provide information to the Policy Control Resource Function (PCRF) about the requirements of the videoconferencing application. The PCRF in turn informs the mobile network components (those components embedding the Policy Control Enforcement Function (PCEF) via the Gx (or variant) interfaces) how to shape the media path session that traverses the mobile network routers. In addition, mobile video collaboration may also make use of additional integrated collaborative feeds (requiring additional bandwidth for the screen images). As an alternative, separate collaborative systems may be used such as WebEx as a separate mobile application where the mobile users manually switches between applications as needed.

The in-band signaling described in conjunction with the RTCP primitives is described to work in conjunction with control plane or as a replacement for control plane signaling in various embodiments. The in-band RTCP primitives provide control signals within the bearer plane. As mentioned above, this can provide many benefits such as faster response times and more dynamic control over the conditions of the RF bearer.

Various encodings of the Rx and Gx interfaces may be used to support the communication of the videoconferencing-related policy parameters that shape the media path. Policy parameters and bandwidth considerations that may be supported and chosen to accommodate mobile videoconferencing include the following:

Voice: The G.711 standard uses 64 kbps encoding, and the MPEG-4 Low Delay Audio Coder (AAC-LD) is compressed to 64 kbps.

Video: CIF has a 768 kbps bit rate; and the H.264 video code at 720p has 1, 1.5 and 2.25 Mbps bit rates. These rates correspond to Good, Better, and Best motion handling, respectively.

Full-duplex: The above are unidirectional measurements, so the target bandwidth may be double to accommodate both directions simultaneously.

Packet Overhead: A general rule of thumb is to add 20% to the above rates to account for packet headers.

Differentiated Services Code Points (DSCP): While traditional video conferencing uses AF4 class, videoconferencing may use the CS4 class for additional quality. For either class, a QoS with Guaranteed Bit Rate (GBR) is established having the ability to handle a 64 kbps burst per video screen feed.

The video collaboration system can use the RTCP primitives for floor control, such as negotiating the number of screens and other capabilities of the videoconferencing end points. In some embodiments, floor control may be achieved using in-band signals in the media plane via protocols that are native to the fixed videoconferencing system, such as Cisco's Videoconferencing Interoperability Protocol (TIP). The TIP protocol specifications describe how to multiplex multiple screens, multiple audio streams, as well as an auxiliary-data screen into a single Real-Time Transport Protocol (RTP) flows, one each for video and audio. It enables point to point and multipoint sessions as well as a mix of multi-screen and single-screen end points.

The TIP protocol specification also defines how RTP Control Protocol (RTCP)—APP extensions are used to indicate profile capabilities and per media flow options as a session is established. It also defines how devices can provide feedback and trigger resiliency mechanisms during the life of the streams. For example, floor control enables the videoconferencing system to direct which end point sends video and what video feed displays on what screen. Since the mobile videoconferencing end point may use one screen, this may primarily involve knowing when to transmit video and knowing what video input is being displayed.

For non-native end points, media interwork/bridge 130 terminates the bearer on the mobile device side, and uses legacy signaling to control those end points. Interwork/bridge 130 terminates the media bearer on the fixed videoconferencing side as well. In this non-native scenario, interwork/bridge 130 may be controlled via an interoperability protocol such as TIP, and/or through out of band signals through an interface between the mobile policy control function.

In some embodiments, the mobile devices operate with an LTE mobile network provided by a Service Provider. Mobile device 100(1) communicates with videoconferencing call manager 150 "over the top" (OTT, or in band) of the underlying network connection using, for example, SIP or H.323-based messaging. That is, mobile device 100(1) uses the mobile network as a pipe to the fixed videoconferencing system, with videoconferencing-specific information being exchanged within that pipe. The mobile device does not need to directly interact with the underlying mobile network call service or policy signaling, nor use the mobile network to provide videoconferencing-specific provisioning and control.

In this embodiment, the Evolved Packet Core (EPC) of the mobile network (described above) uses Deep Packet Inspection (DPI) mechanisms to detect that a mobile using the LTE data service is using an OTT application to communicate directly to the primary videoconferencing call manager. Inspection of SIP, SDP, RTP, and/or RTCP streams allows the DPI to classify the application as a videoconferencing application. The DPI may be performed within either the RAN 105, the gateway 120, media interwork/bridge 130, or at session border control 180. If session border control 180 performs the DPI, it can use an interface to inform the PCRF within the mobile network so that the PCRF can in turn use the Gx interface to radio access network 105 to adjust the session bearers to accommodate the session in some embodiments.

This scenario may require the user to have a service option in their profile so that the LTE network operator can be compensated by either the user or the videoconferencing system for the QoS used. The interface may be an Rx interface, as described by 3GPP specification TS 29.211, possibly containing videoconferencing-specific additions. These additions are signified by "RX+" to indicate that while the types of information carried in this interface may have elements analogous to the 3GPP-defined Rx interface, they can also include additional elements, and as such, interface may be considered a user-policy interface. Interface 258 may also be implemented using a custom interface, such as an HTTP-based SOAP interface, Web2.0, or REST technology as well as a DIAMETER-based protocol.

Mobile Devices

The mobile devices described earlier can communicate with a plurality of radio access networks using a plurality of access technologies, and possibly in combination with wired communication networks. The mobile device can be a smartphone offering advanced capabilities such as word processing, web browsing, gaming, e-book capabilities, an operating system, and a full keyboard. The mobile device may run an operating system such as Symbian OS, iPhone OS, RIM's Blackberry, Windows Mobile, Linux, Palm WebOS, and Android. The screen may be a touch screen that can be used to input data to the mobile device, and the screen may be used instead of the full keyboard. The mobile device may have the capability to run applications or communicate with applications that are provided by servers in the communication network. The mobile device can receive updates and other information from these applications on the network.

The mobile device also encompasses many other devices such as personal televisions (TVs), video projectors, set-top boxes or set-top units, digital video recorders (DVR), computers, netbooks, laptops, and any other audio/visual equipment that can communicate with a network. The mobile device could also be a remotely controlled, self-propelled robot that functions as a sort of avatar to project the virtual presence of a person from one location to another. The robot can carry a video screen showing the face of the remote operator, along with microphones and cameras and speakers to allow people in the robot's environment to interact with the robot in a similar fashion to how they might interact with the operator if he or she were present. The mobile device can also keep global positioning coordinates, profile information, or other location information in its stack or memory. The mobile device can have a memory such as a computer readable medium, flash memory, a magnetic disk drive, an optical drive, a programmable read-only memory (PROM), and/or a read-only memory (ROM). The mobile device can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The mobile device can also provide a variety of user interfaces such as a keyboard, one or more still or video cameras, a touch screen, a trackball, a touch pad, and/or a mouse. The mobile device may also include speakers and a display device in some embodiments.

Radio Access Network

Figure 6:
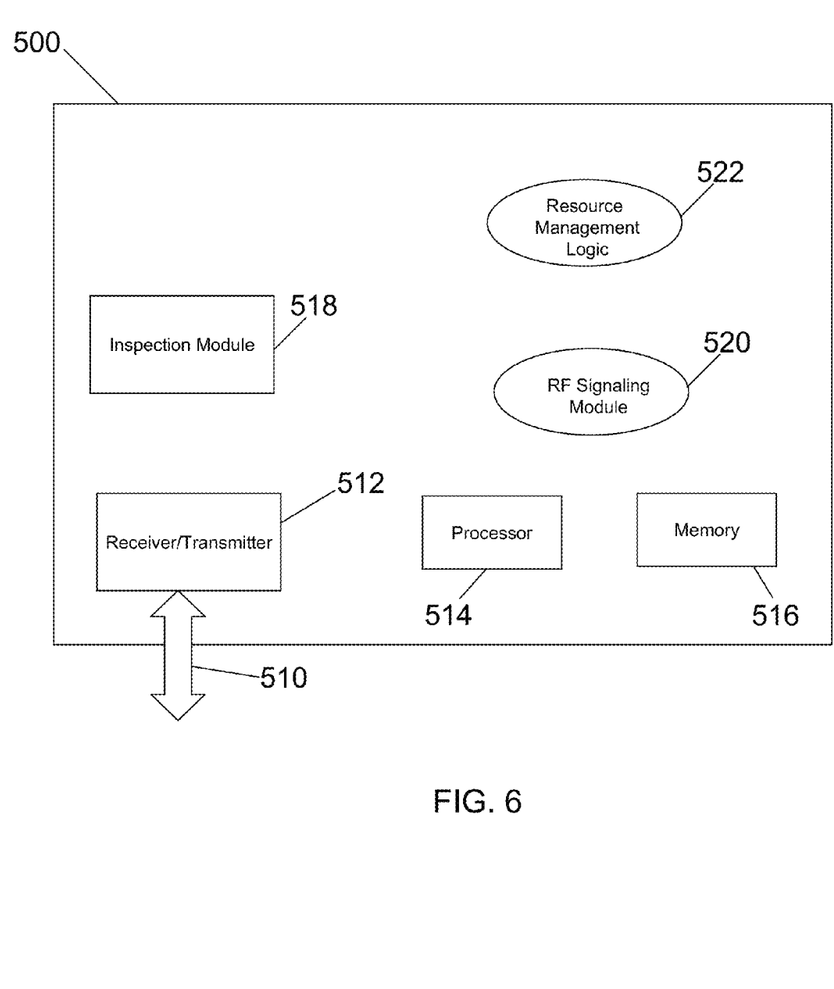
FIG. 6 illustrates a radio access network device in accordance with certain embodiments.

In some embodiments the in-band control signaling is implemented in the radio access network (RAN). FIG. 6 illustrates a radio access network in accordance with some embodiments. The RAN device 500 can include an interface 510, a receiver/transmitter 512, a processor 514, a memory 516, an inspection module 518, an RF signaling module 520, a RF signaling module 520, and a resource management logic 522. The interface 510 includes one or more physical connections that can be either wired or wireless to communicate information to and from RAN 500. The receiver/transmitter works with interface 510 to provide signals to communicate information from RAN 500 and to receive information from interface 510. In some embodiments, the RAN 500 receives electrical or optical signals on interface 510 from the access networks and transmits radio frequency signals to provide RF bearers to mobile devices. The processor 514 can be one or more integrated circuits that are a multipurpose, programmable, clock-driven, register-based electronic device that accepts binary data as input, processes it according to instructions stored in its memory, and provides results as output. In some embodiments, the processor 514 can be constructed for a specific purpose such as network processing unit to perform packet processing or another specific task.

Memory 516 can be any type of computer readable medium such as random access memory (RAM), programmable read-only memory (PROM), a field programmable gate array (FPGA), flash memory, optical disk drive, or magnetic storage medium. The memory 516 can be used to store computer programs or logic that can be run on processor 514. The memory 516 can also store information such as data structures and other data that is used for dynamically managing resources for video collaboration. The inspection module 518 can be hardware or software for performing inspection of packets. The inspection module 518 can perform deep packet inspection (DPI) or shallow packet inspection (SPI) in order to recover information that resides within the bearer plane. In this fashion, RAN 500 can determine information from RTCP primitives in some embodiments.

RF signaling module 520 can be used to control the modulation of signals for placement into RF bearers for transmitting information wireless to mobile devices. The RF signaling module 520 can also control the creation of RF bearers and map the information communicated with the access network to the radio frequency network. Resource management logic 522

Mobile Gateway

The gateway 120 described above can be implemented in a network device in some embodiments. This network device can implement multiple and different integrated functionalities. In some embodiments, one or more of the following functionalities (not shown in the figures referenced above) can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The offload gateway can be implemented as any combination of the following including an xGSN, an xGW, an xGW-SGW, and an xGW-PGW.

Figure 7:
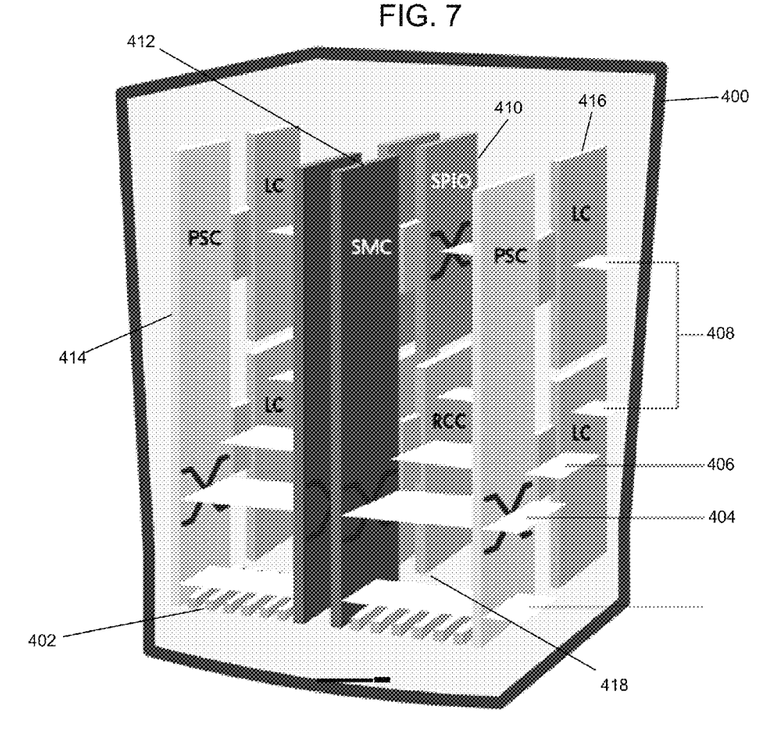
FIG. 7 illustrates a gateway in accordance with some embodiments.

In some embodiments, gateway 120 is implemented using a collection of integrated circuit boards or cards. These cards include input/output interfaces for communication amongst each other, at least one processor for executing instructions and running modules that are stored in memory, and memory for storing data. The features of a network device that can implement a gateway, in accordance with some embodiments, are further described below. FIG. 7 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and/or manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments.

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group, users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims.

We claim:

1. A method comprising:
receiving a plurality of video streams and a plurality of audio streams that are part of a video collaboration session in a transport protocol;
determining that in-band information regarding the plurality of video and audio streams is provided in transport control protocol primitives generated by a network device involved in communicating the plurality of video streams and a plurality of audio streams in the video collaboration session;
performing an inspection of the video stream and the audio stream to map the streams to radio frequency (RF) bearers where an indicator is used to identify the mapping; and
adapting the RF bearers based on information in received in-band primitives of an associated stream in the video collaboration session, wherein the information of the received in-band primitives are used to determine dynamic changes to the RF bearers.

2. The method of claim 1, wherein the transport control protocol primitive is a modified real-time transport control protocol (RTCP) that includes an identifier to allow multiple streams to be transported on the same channel and an extension is used to carry control information.

3. The method of claim 1, further comprising receiving an ECHO primitive in-band that provides measurements of a network path and quality of service (QoS) used by a radio access network in adapting the RF bearers.

4. The method of claim 1, further comprising triggering dedicated bearer packet data protocol (PDP) establishment and traffic flow template (TFT) mapping when the video collaboration session is detected.

5. The method of claim 1, further comprising adjusting in-band one of a plurality of bitstreams that are part of a video stream of the video collaboration based on observed error rates in that bitstream.

6. The method of claim 1, wherein the adapting of the RF bearers occurs at least once every second based on in-band primitive information regarding the video collaboration session.

7. The method of claim 1, wherein the adapting of the RF bearers includes selection of bearer with defined characteristics and changing characteristics of the RF bearer including bandwidth, burst, and packet loss.

8. An apparatus comprising:
an interface configured to receive a plurality of video streams and a plurality of audio streams that are part of a video collaboration session in a transport protocol;
a processor configured to inspect the plurality of video and audio streams in the video collaboration to determine that in-band information is provided in transport control protocol primitives and to perform a deep packet inspection of the video stream and the audio stream to map the streams to radio frequency (RF) bearers where an indicator is used to identify the mapping;
a module configured to adapt the RF bearers based on information in received in-band primitives of an associated stream in the video collaboration session, wherein the information of the received in-band primitives are used to determine dynamic changes to the RF bearers.

9. The apparatus of claim 8, wherein the transport control protocol primitive is a modified real-time transport control protocol (RTCP) that includes an identifier to allow multiple streams to be transported on the same channel and an extension is used to carry control information.

10. The apparatus of claim 8, wherein one of the transport control protocol primitives is an ECHO primitive in-band that provides measurements of a network path and quality of service (QoS) used by the radio access network in adapting the RF bearers.

11. The apparatus of claim 8, wherein the module triggers dedicated bearer packet data protocol (PDP) establishment and traffic flow template (TFT) mapping when the video collaboration session is detected.

12. The apparatus of claim 8, wherein the module adjusts in-band one of a plurality of bitstreams that are part of a video stream of the video collaboration based on observed error rates in that bitstream.

13. The apparatus of claim 8, wherein the module is configured to adapt the RF bearers at least once every second based on in-band primitive information regarding the video collaboration session.

14. The apparatus of claim 8, wherein the adapting of the RF bearers by the module includes selection of bearer with defined characteristics and changing characteristics of the RF bearer including bandwidth, burst, and packet loss.

15. A non-transitory computer readable medium comprising instructions operable to cause a data processing apparatus to:
receive, at a radio access network, a plurality of video streams and a plurality of audio streams that are part of a video collaboration session in a transport protocol;
determine that in-band information regarding the plurality of video and audio streams is provided in transport control protocol primitives;
initiate a handshake procedure with a remote peer that is handling the video collaboration to configure the in-band management of the video collaboration session;
map the streams to radio frequency (RF) bearers where an indicator is used to identify the mapping; and
adapt the RF bearers based on received in-band primitives that describe characteristics of an associated stream in the video collaboration session, wherein the characteristics of the associated stream are used to determine dynamic changes to the RF bearers.

16. The non-transitory computer readable medium of claim 15, wherein the transport control protocol primitive is a modified real-time transport control protocol (RTCP) that includes an identifier to allow multiple streams to be transported on the same channel and an extension is used to carry control information.

17. The non-transitory computer readable medium of claim 15, further comprising instructions operable to cause the data processing apparatus to receive an ECHO primitive in-band that provides measurements of a network path and quality of service (QoS) used by the radio access network in adapting the RF bearers.

18. The non-transitory computer readable medium of claim 15, further comprising instructions operable to cause the data processing apparatus to trigger dedicated bearer packet data protocol (PDP) establishment and traffic flow template (TFT) mapping when the video collaboration session is detected.

19. The non-transitory computer readable medium of claim 15, further comprising instructions operable to cause the data processing apparatus to adjust in-band one of a plurality of bitstreams that are part of a video stream of the video collaboration based on observed error rates in that bitstream.

20. The non-transitory computer readable medium of claim 15, wherein the adapting of the RF bearers occurs at least once every second based on in-band primitive information regarding the video collaboration session.

* * * * *